US012770879B2

(12) United States Patent
Zhao et al.

(10) Patent No.: US 12,770,879 B2
(45) Date of Patent: Oct. 20, 2026

(54) PROTECTIVE COATINGS FOR LITHIUM METAL ELECTRODES AND METHODS OF FORMING THE SAME

(71) Applicant: GM GLOBAL TECHNOLOGY OPERATIONS LLC, Detroit, MI (US)

(72) Inventors: Yifan Zhao, Warren, MI (US); Xingcheng Xiao, Troy, MI (US); Shuru Chen, Troy, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 962 days.

(21) Appl. No.: 17/578,169

(22) Filed: Jan. 18, 2022

(65) Prior Publication Data

US 2023/0231135 A1 Jul. 20, 2023

(51) Int. Cl.

| | |
|---|---|
| ***H01M 4/62*** | (2006.01) |
| ***H01M 4/02*** | (2006.01) |
| ***H01M 4/36*** | (2006.01) |
| ***H01M 4/38*** | (2006.01) |
| ***H01M 10/0525*** | (2010.01) |

(52) U.S. Cl.

CPC ............. *H01M 4/62* (2013.01); *H01M 4/366* (2013.01); *H01M 4/382* (2013.01); *H01M 10/0525* (2013.01); *H01M 2004/021* (2013.01); *H01M 2004/027* (2013.01); *H01M 2220/20* (2013.01)

(58) Field of Classification Search

None

See application file for complete search history.

(56) References Cited

U.S. PATENT DOCUMENTS

| | | | | |
|---|---|---|---|---|
| 6,203,942 | B1 | 3/2001 | Gan et al. | |
| 2017/0062829 | A1* | 3/2017 | Ryu | H01M 10/0569 |
| 2019/0044179 | A1* | 2/2019 | Sugimori | H01M 4/131 |
| 2019/0379056 | A1 | 12/2019 | Chen | |
| 2020/0335767 | A1 | 10/2020 | Archer et al. | |
| 2021/0020949 | A1 | 1/2021 | Du et al. | |

(Continued)

FOREIGN PATENT DOCUMENTS

| | | | | |
|---|---|---|---|---|
| CN | 105703008 A | | 6/2016 | |
| CN | 107093705 A | * | 8/2017 | H01M 4/0416 |

(Continued)

OTHER PUBLICATIONS

Machine Translation—US 20210020949 A1 (Year: 2021).*

(Continued)

*Primary Examiner* — Ula C Ruddock
*Assistant Examiner* — Christina Renee Daulton
(74) *Attorney, Agent, or Firm* — Harness, Dickey & Pierce, P.L.C.

(57) ABSTRACT

An electrode includes an electroactive material layer and a protective layer disposed on or adjacent to a surface of the electroactive material layer. The protective layer includes a polymerized cyclic ether and a salt dispersed therewithin. The salt includes a nitrate salt and a phosphate salt. The salt may also include a Lewis acid salt. The protective layer is formed by disposing a solution, including the salt and solvent, on or adjacent to the surface of the electroactive material layer, and polymerizing the solvent. The solvent includes the cyclic ether, and also, one or more organic phosphates.

20 Claims, 6 Drawing Sheets

(56) References Cited

U.S. PATENT DOCUMENTS

| | | | |
|---|---|---|---|
| 2021/0098790 A1 | 4/2021 | He et al. |
| 2021/0351406 A1 | 11/2021 | Kumar et al. |
| 2022/0359875 A1 | 11/2022 | Chen et al. |
| 2023/0028245 A1 | 1/2023 | Arai et al. |
| 2023/0335706 A1 | 10/2023 | Zhao et al. |

FOREIGN PATENT DOCUMENTS

| | | | | | |
|---|---|---|---|---|---|
| CN | 109103517 | A | * | 12/2018 | ........ H01M 10/0525 |
| CN | 113471542 | A | * | 10/2021 | .......... H01M 10/058 |
| CN | 116504924 | A | | 7/2023 | |
| CN | 116960279 | A | | 10/2023 | |
| DE | 102022126197 | A1 | | 7/2023 | |
| DE | 102022126715 | A1 | | 10/2023 | |
| WO | 2018171245 | A1 | | 9/2018 | |
| WO | WO-2021005377 | A1 | | 1/2021 | |

OTHER PUBLICATIONS

Machine Translation—CN_113471542_A (Year: 2021).*
Machine Translation—CN_107093705_A (Year: 2017).*
Machine Translation—CN109103517A (Year: 2018).*
First Office Action for German Patent Application No. 102022126197.2 issued Dec. 4, 2024, with correspondence from Manitz Finsterwald Patent—und Rechtsanwaltspartnerschaft mbB summarizing Office Action; 5 pages.
First Office Action for Chinese Patent Application No. 202211259583.0 issued Jul. 17, 2025, with correspondence from China Patent Agent (H.K.) Ltd summarizing Office Action; 10 pages.
Notice of Allowance for U.S. Appl. No. 17/720,913 issued Feb. 21, 2025.

* cited by examiner

PROTECTIVE COATINGS FOR LITHIUM METAL ELECTRODES AND METHODS OF FORMING THE SAME

INTRODUCTION

This section provides background information related to the present disclosure which is not necessarily prior art.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator and/or electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte, the solid-state electrolyte may physically separate the electrodes so that a distinct separator is not required.

Many different materials may be used to create components for a lithium-ion battery. By way of non-limiting example, cathode materials for lithium-ion batteries typically comprise an electroactive material which can be intercalated or alloyed with lithium ions, such as lithium-transition metal oxides or mixed oxides of the spinel type, for example including spinel $LiMn_2O_4$, $LiCoO_2$, $LiNiO_2$, $LiMn_{1.5}Ni_{0.5}O_4$, $LiNi_{(1-x-y)}Co_xM_yO_2$ (where $0<x<1$, $y<1$, and M may be Al, Mn, or the like), or lithium iron phosphates. The electrolyte typically contains one or more lithium salts, which may be dissolved and ionized in a non-aqueous solvent. Common negative electrode materials include lithium insertion materials or alloy host materials, like carbon-based materials, such as lithium-graphite intercalation compounds, or lithium-silicon compounds, lithium-tin alloys, and lithium titanate $Li_{4+x}Ti_5O_{12}$, where $0 \le x \le 3$, such as $Li_4Ti_5O_{12}$ (LTO).

The negative electrode may also be made of a lithium-containing material, such as metallic lithium, so that the electrochemical cell is considered a lithium metal battery or cell. Metallic lithium for use in the negative electrode of a rechargeable battery has various potential advantages, including having the highest theoretical capacity and lowest electrochemical potential. Thus, batteries incorporating lithium metal anodes can have a higher energy density that can potentially double storage capacity, so that the battery may be half the size, but still last the same amount of time as other lithium-ion batteries. Thus, lithium metal batteries are one of the most promising candidates for high energy storage systems. However, lithium metal batteries also have potential downsides, including possibly exhibiting unreliable or diminished performance and potential premature electrochemical cell failure. For example, side reactions may occur between the lithium metal and the adjacent electrolyte undesirably promoting the formation of a solid-electrolyte interface ("SEI") and/or continuous electrolyte decomposition and/or active lithium consumption. Accordingly, it would be desirable to develop materials for use in high energy lithium-ion batteries that reduce or suppress lithium metal side reactions.

SUMMARY

This section provides a general summary of the disclosure, and is not a comprehensive disclosure of its full scope or all of its features.

The present disclosure relates to protective coatings for negative electrodes, and more particularly, to artificial solid-electrolyte interphase ("SEI") layers for lithium metal electrodes, and methods of making and using the same.

In various aspects, the present disclosure provides an electrode. The electrode may include an electroactive material layer, and a protective layer disposed on or adjacent to one or more surfaces of the electroactive material layer. The protective layer may include a polymerized 1,3-dioxolane (DOL) matrix having one or more salts dispersed therewithin.

In one aspect, the protective layer may have an elastic modulus greater than or equal to about 0.01 GPa to less than or equal to about 50 GPa. The protective layer may have a thickness greater than or equal to about 50 nm to less than or equal to about 10 μm.

In one aspect, the one or more salts may include a first salt and a second salt. The first salt may be selected from the group consisting of: lithium nitrate ($LiNO_3$), potassium nitrate ($KNO_3$), cesium nitrate ($CsNO_3$), and combinations thereof. The second salt may be selected from the group consisting of: lithium phosphate ($Li_3PO_4$), potassium phosphate ($K_3PO_4$), cesium phosphate ($Cs_3PO_4$), and combinations thereof.

In one aspect, the one or more salts may further include a third salt selected from the group consisting of: lithium hexafluorophosphate ($LiPF_6$), lithium difluoro(oxalato)borate (LiDFOB), and combinations thereof.

In one aspect, the protective layer may include greater than or equal to about 20 wt. % to less than or equal to about 80 wt. % of the polymerized 1,3-dioxolane (DOL) matrix, and greater than or equal to about 40 wt. % to less than or equal to about 60 wt. % of the one or more salts.

In one aspect, the electroactive material layer may include lithium metal.

In various aspects, the present disclosure provides an electrochemical cell that cycles lithium ions. The electrochemical cell may include an electrode, a separator. and a protective layer disposed between the electrode and the separator. The protective layer may include a polymerized matrix having one or more lithium salts dispersed therewithin. The polymerized matrix may include a polymerized cyclic ether. The one or more salts may include lithium nitrate ($LiNO_3$) and lithium phosphate ($Li_3PO_4$).

In one aspect, the polymerized cyclic ether may include 1,3-dioxolane (DOL).

In one aspect, the polymerized cyclic ether may include tetrahydrofuran (THF).

In one aspect, the one or more lithium salts may further include lithium hexafluorophosphate ($LiPF_6$) and/or lithium difluoro(oxalato)borate (LiDFOB).

In one aspect, the protective layer may include greater than or equal to about 20 wt. % to less than or equal to about 80 wt. % of the polymerized cyclic ether, greater than or equal to about 5 wt. % to less than or equal to about 30 wt. % of the lithium nitrate ($LiNO_3$), greater than or equal to about 20 wt. % to less than or equal to about 80 wt. % of the lithium phosphate ($Li_3PO_4$), and greater than or equal to about 20 wt. % to less than or equal to about 30 wt. % of the lithium hexafluorophosphate ($LiPF_6$) and/or lithium difluoro (oxalato)borate (LiDFOB).

In one aspect, the protective layer may have an elastic modulus greater than or equal to about 0.01 GPa to less than or equal to about 50 GPa. The protective layer may have a thickness greater than or equal to about 50 nm to less than or equal to about 10 μm.

In various aspects, the present disclosure provides a method for forming an electrode, where the electrode includes an electroactive material layer and a protective layer disposed thereon. The method may include disposing a solution on or adjacent to a surface of the electroactive material layer. The solution may include a salt dissolved in a solvent mixture. The solvent mixture may include a cyclic ether and one or more organic phosphates represented by:

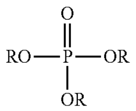

where R is a methyl group, an ethyl group, or $CH_2CF_3$. The method may further include polymerizing the cyclic ether to form a matrix. The matrix may include the polymerized cyclic ether, and the salt may be dispersed throughout the matrix to form the protective layer.

In one aspect, the cyclic ether may include 1,3-dioxolane (DOL).

In one aspect, the cyclic ether may include tetrahydrofuran (THF).

In one aspect, the salt may be selected from the group consisting of: lithium nitrate ($LiNO_3$), potassium nitrate ($KNO_3$), cesium nitrate ($CsNO_3$), and combinations thereof.

In one aspect, the salt may be a first salt and the solution may further include a second salt. The second salt may be selected from the group consisting of: lithium hexafluorophosphate ($LiPF_6$), lithium difluoro(oxalato)borate (LiDFOB), and combinations thereof.

In one aspect, the solution may include greater than or equal to about 20 wt. % to less than or equal to about 80 wt. % of the cyclic ether, greater than or equal to about 5 wt. % to less than or equal to about 20 wt. % of the first salt, greater than or equal to about 20 wt. % to less than or equal to about 80 wt. % of the one or more organic phosphates, and greater than or equal to about 5 wt. % to less than or equal to about 20 wt. % of the second salt.

In one aspect, during the polymerization the one or more organic phosphates may be reduced to form a phosphate salt, and the phosphate salt may be dispersed throughout the matrix with the salt.

In one aspect, the method may further include vacuum drying the protective layer.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
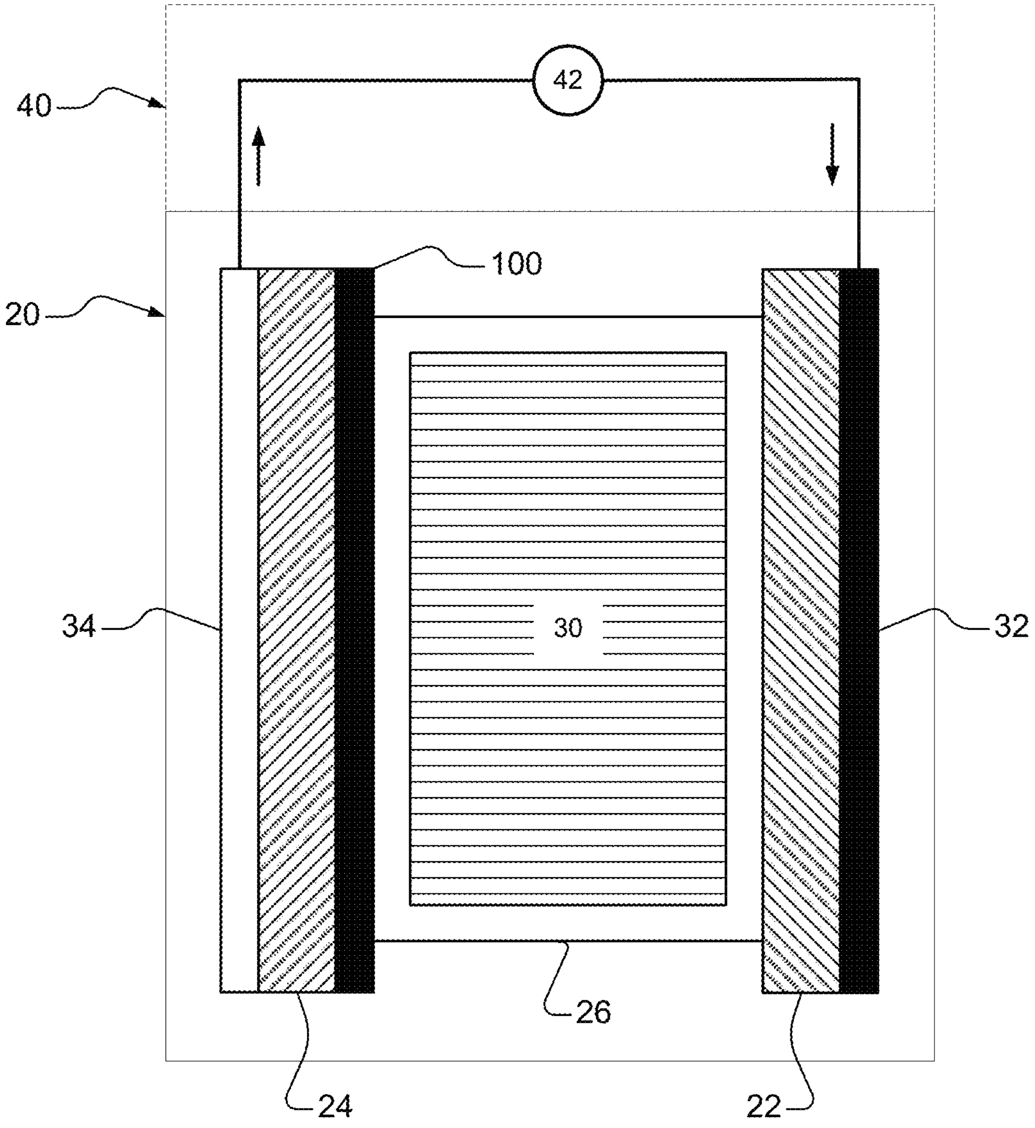
FIG. 1 is an illustration of an example electrochemical battery cell having an artificial solid-electrolyte interphase ("SEI") layer in accordance with various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

A typical lithium-ion battery includes a first electrode (such as a positive electrode or cathode) opposing a second electrode (such as a negative electrode or anode) and a separator and/or electrolyte disposed therebetween. Often, in a lithium-ion battery pack, batteries or cells may be electrically connected in a stack or winding configuration to increase overall output. Lithium-ion batteries operate by reversibly passing lithium ions between the first and second electrodes. For example, lithium ions may move from a positive electrode to a negative electrode during charging of the battery, and in the opposite direction when discharging the battery. The electrolyte is suitable for conducting lithium ions and may be in liquid, gel, or solid form. For example, an exemplary and schematic illustration of an electrochemical cell (also referred to as the battery) 20 is shown in FIG. 1.

Such cells are used in vehicle or automotive transportation applications (e.g., motorcycles, boats, tractors, buses, motorcycles, mobile homes, campers, and tanks). However, the present technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. Further, although the illustrated examples include a single positive electrode cathode and a single anode, the skilled artisan will recognize that the present teachings extend to various other configurations, including those having one or more cathodes and one or more anodes, as well as various current collectors with electroactive layers disposed on or adjacent to one or more surfaces thereof.

The battery 20 includes a negative electrode 22 (e.g., anode), a positive electrode 24 (e.g., cathode), and a separator 26 disposed between the two electrodes 22, 24. The separator 26 provides electrical separation—prevents physical contact—between the electrodes 22, 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the negative electrode 22 and positive electrode 24. In certain variations, the separator 26 may be formed by a solid-state electrolyte or a semi-solid-state electrolyte (e.g., gel electrolyte). For example, the separator 26 may be defined by a plurality of solid-state electrolyte particles (not shown). In the instance of solid-state batteries and/or semi-solid-state batteries, the positive electrode 24 and/or the negative electrode 22 may include a plurality of solid-state electrolyte particles (not shown). The plurality of solid-state electrolyte particles included in, or defining, the separator 26 may be the same as or different from the plurality of solid-state electrolyte particles included in the positive electrode 24 and/or the negative electrode 22.

A first current collector 32 (e.g., a negative current collector) may be positioned at or near the negative electrode 22. The first current collector 32 may be a metal foil, metal grid or screen, or expanded metal comprising copper or any other appropriate electrically conductive material known to those of skill in the art. A second current collector 34 (e.g., a positive current collector) may be positioned at or near the positive electrode 24. The second electrode current collector 34 may be a metal foil, metal grid or screen, or expanded metal comprising aluminum or any other appropriate electrically conductive material known to those of skill in the art. The first current collector 32 and the second current collector 34 may respectively collect and move free electrons to and from an external circuit 40. For example, an interruptible external circuit 40 and a load device 42 may connect the negative electrode 22 (through the first current collector 32) and the positive electrode 24 (through the second current collector 34).

The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The chemical potential difference between the positive electrode 24 and the negative electrode 22 drives electrons produced by a reaction, for example, the oxidation of intercalated lithium, at the negative electrode 22 through the external circuit 40 toward the positive electrode 24. Lithium ions that are also produced at the negative electrode 22 are concurrently transferred through the electrolyte 30 contained in the separator 26 toward the positive electrode 24. The electrons flow through the external circuit 40 and the lithium ions migrate across the separator 26 containing the electrolyte 30 to form intercalated lithium at the positive electrode 24. As noted above, the electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back toward the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the first current collector 32, negative electrode 22, separator 26, positive electrode 24, and second current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 shown in FIG. 1 includes a liquid electrolyte 30 and shows representative concepts of battery operation. However, the present technology also applies to solid-state batteries and/or semi-solid state batteries that include solid-state electrolytes and/or solid-state electrolyte particles and/or semi-solid electrolytes and/or solid-state electroactive particles that may have different designs as known to those of skill in the art.

As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the lithium-ion battery 20. For example, in certain aspects, the electrolyte 30 may be a non-aqueous liquid electrolyte solution (e.g., >1M) that includes a lithium salt dissolved in an organic solvent or a mixture of organic solvents. Numerous conventional non-aqueous liquid electrolyte 30 solutions may be employed in the battery 20.

A non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide ($LiN(FSO_2)_2$) (LiSFI), and combinations thereof. These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof.

The porous separator 26 may include, in certain instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of polyethylene (PE) and polypropylene (PP), or multi-layered structured porous films of PE and/or PP. Commercially available polyolefin porous separator membranes 26 include CELGARD® 2500 (a monolayer polypropylene separator) and CELGARD® 2320 (a trilayer polypropylene/polyethylene/polypropylene separator) available from Celgard LLC.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics.

In certain aspects, the separator 26 may further include one or more of a ceramic materials and a heat-resistant material. For example, the separator 26 may also be admixed with the ceramic material and/or the heat-resistant material, or one or more surfaces of the separator 26 may be coated with the ceramic material and/or the heat-resistant material. In certain variations, the ceramic material and/or the heat-resistant material may be disposed on one or more sides of the separator 26. The ceramic material may be selected from the group consisting of: alumina ($Al_2O_3$), silica ($SiO_2$), and combinations thereof. The heat-resistant material may be selected from the group consisting of: Nomex, Aramid, and combinations thereof.

Various conventionally available polymers and commercial products for forming the separator 26 are contemplated, as well as the many manufacturing methods that may be employed to produce such a microporous polymer separator 26. In each instance, the separator 26 may have an average thickness greater than or equal to about 1 μm to less than or equal to about 50 μm, and in certain instances, optionally greater than or equal to about 1 μm to less than or equal to about 20 μm. The separator 26 may have an average thickness greater than or equal to 1 μm to less than or equal to 50 μm, and in certain instances, optionally greater than or equal to 1 μm to less than or equal to 20 μm.

In various aspects, the porous separator 26 and/or the electrolyte 30 disposed in the porous separator 26 as illustrated in FIG. 1 may be replaced with a solid-state electrolyte ("SSE") layer (not shown) and/or semi-solid-state electrolyte (e.g., gel) layer that functions as both an electrolyte and a separator. The solid-state electrolyte layer and/or semi-solid-state electrolyte layer may be disposed between the positive electrode 24 and negative electrode 22. The solid-state electrolyte layer and/or semi-solid-state electrolyte layer facilitates transfer of lithium ions, while mechanically separating and providing electrical insulation between the negative and positive electrodes 22, 24. By way of non-limiting example, the solid-state electrolyte layer and/or semi-solid-state electrolyte layer may include a plurality of solid-state electrolyte particles, such as $LiTi_2(PO_4)_3$, $LiGe_2(PO_4)_3$, $Li_7La_3Zr_2O_{12}$, $Li_3xLa_{2/3}\text{-}xTiO_3$, $Li_3PO_4$, $Li_3N$, $Li_4GeS_4$, $Li_{10}GeP_2S_{12}$, $Li_2S—P_2S_5$, $Li_6PS_5Cl$, $Li_6PS_5Br$, $Li_6PS_5I$, $Li_3OCl$, $Li_{2.99}Ba_{0.005}ClO$, or combinations thereof.

The positive electrode 24 may be formed from a lithium-based active material that is capable of undergoing lithium intercalation and deintercalation, alloying and dealloying, or plating and stripping, while functioning as the positive terminal of a lithium-ion battery. The positive electrode 24 can be defined by a plurality of electroactive material particles (not shown). Such positive electroactive material particles may be disposed in one or more layers so as to define the three-dimensional structure of the positive electrode 24. The electrolyte 30 may be introduced, for example after cell assembly, and contained within pores (not shown) of the positive electrode 24. In certain variations, the positive electrode 24 may include a plurality of solid-state electrolyte particles (not shown). In each instance, the positive electrode 24 may have an average thickness greater than or equal to about 1 μm to less than or equal to about 500 μm, and in certain aspects, optionally greater than or equal to about 10 μm to less than or equal to about 200 μm. The positive electrode 24 may have an average thickness greater than or equal to 1 μm to less than or equal to 500 μm, and in certain aspects, optionally greater than or equal to 10 μm to less than or equal to 200 μm.

One exemplary common class of known materials that can be used to form the positive electrode 24 is layered lithium transitional metal oxides. For example, in certain aspects, the positive electrode 24 may comprise one or more materials having a spinel structure, such as lithium manganese oxide ($Li_{(1+x)}Mn_2O_4$, where $0.1 \leq x \leq 1$) (LMO), lithium manganese nickel oxide ($LiMn_{(2-x)}Ni_xO_4$, where $0 \leq x \leq 0.5$) (LNMO) (e.g., $LiMn_{1.5}Ni_{0.5}O_4$); one or more materials with a layered structure, such as lithium cobalt oxide ($LiCoO_2$), lithium nickel manganese cobalt oxide ($Li(Ni_xMn_yCo_z)O_2$, where $0 \leq x > 1$, $0 \leq y \leq 1$, $0 \leq z \leq 1$, and $x+y+z=1$) (e.g., $LiMn_{0.33}Ni_{0.33}Co_{0.33}O_2$) (NMC), or a lithium nickel cobalt metal oxide ($LiNi_{(1-x-y)}Co_xM_yO_2$, where $0<x<0.2$, $y<0.2$, and M may be Al, Mg, Ti, or the like); or a lithium iron polyanion oxide with olivine structure, such as lithium iron phosphate ($LiFePO_4$) (LFP), lithium manganese-iron phosphate ($LiMn_{2-x}—Fe_xPO_4$, where $0<x<0.3$) (LFMP), or lithium iron fluorophosphate ($Li_2FePO_4F$). In various aspects, the positive electrode 24 may comprise one or more electroactive materials selected from the group consisting of: NCM 111, NCM 532, NCM 622, NCM 811, NCMA, LFP, LMO, LFMP, LLC, and combinations thereof.

In certain variations, the positive electroactive material(s) in the positive electrode 24 may be optionally intermingled with an electronically conducting material that provides an electron conduction path and/or at least one polymeric binder material that improves the structural integrity of the electrode 24. For example, the positive electroactive material(s) in the positive electrode 24 may be optionally intermingled (e.g., slurry casted) with binders like polyimide, polyamic acid, polyamide, polysulfone, polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, or lithium alginate. Electrically conducting materials may include carbon-based materials, powdered nickel or other metal particles, or a conductive polymer. Carbon-based materials may include, for example, particles of graphite, acetylene black (such as KETJEN™ black or DENKA™ black), carbon fibers and nanotubes, graphene, and the like. Examples of a conductive polymer include polyaniline, polythiophene, polyacetylene, polypyrrole, and the like. In certain aspects, mixtures of the conductive materials may be used.

The positive electrode 24 may include greater than or equal to about 5 wt. % to less than or equal to about 99 wt. %, optionally greater than or equal to about 10 wt. % to less than or equal to about 99 wt. %, and in certain variations, greater than or equal to about 50 wt. % to less than or equal to about 98 wt. %, of the positive electroactive material(s); greater than or equal to 0 wt. % to less than or equal to about 40 wt. %, and in certain aspects, optionally greater than or equal to about 1 wt. % to less than or equal to about 20 wt. %, of the electronically conducting material; and greater than or equal to 0 wt. % to less than or equal to about 40 wt. %, and in certain aspects, optionally greater than or equal to about 1 wt. % to less than or equal to about 20 wt. %, of the at least one polymeric binder.

The positive electrode 24 may include greater than or equal to 5 wt. % to less than or equal to 99 wt. %, optionally greater than or equal to 10 wt. % to less than or equal to 99 wt. %, and in certain variations, greater than or equal to 50 wt. % to less than or equal to 98 wt. %, of the positive electroactive material(s); greater than or equal to 0 wt. % to less than or equal to 40 wt. %, and in certain aspects, optionally greater than or equal to 1 wt. % to less than or equal to 20 wt. %, of the electronically conducting material; and greater than or equal to 0 wt. % to less than or equal to 40 wt. %, and in certain aspects, optionally greater than or equal to 1 wt. % to less than or equal to 20 wt. %, of the at least one polymeric binder.

The negative electrode 22 may be formed from a lithium host material that is capable of functioning as a negative terminal of a lithium-ion battery. In various aspects, the negative electrode 22 may be defined by a plurality of negative electroactive material particles (not shown). Such negative electroactive material particles may be disposed in one or more layers so as to define the three-dimensional structure of the negative electrode 22. The electrolyte 30 may be introduced, for example after cell assembly, and contained within pores (not shown) of the negative electrode 22. For example, in certain variations, the negative electrode 22 may include a plurality of solid-state electrolyte particles (not shown). In each instance, the negative electrode 22 (including the one or more layers) may have a thickness greater than or equal to 0 nm to less than or equal to about 500 μm, optionally greater than or equal to about 1 μm to less than or equal to about 500 μm, and in certain aspects, optionally greater than or equal to about 10 μm to less than or equal to about 200 μm. The negative electrode 22 (including the one or more layers) may have a thickness greater than or equal to 0 nm μm to less than or equal to 500 μm, optionally greater than or equal to 1 μm to less than or equal to 500 μm, and in certain aspects, optionally greater than or equal to 10 μm to less than or equal to 200 μm.

In various aspects, the negative electroactive material may include lithium, for example, a lithium alloy and/or a lithium metal. For example, in certain variations, the negative electrode 22 may be defined by a lithium metal foil. The lithium metal foil may have an average thickness greater than or equal to about 0 nm to less than or equal to about 500 μm, and in certain aspects, optionally greater than or equal to about 50 nm to less than or equal to about 50 μm.

In other variations, the negative electroactive material may include, for example only, carbonaceous materials (such as, graphite, hard carbon, soft carbon, and the like) and metallic active materials (such as tin, aluminum, magnesium, germanium, and alloys thereof, and the like). In still other variations, the negative electroactive material may be a silicon-based electroactive material, and in further variations, the negative electroactive material may include a combination of the silicon-based electroactive material (i.e., first negative electroactive material) and one or more other negative electroactive materials. The one or more other negative electroactive materials include, for example only, carbonaceous materials (such as, graphite, hard carbon, soft carbon, and the like) and metallic active materials (such as tin, aluminum, magnesium, germanium, and alloys thereof, and the like). For example, in certain variations, the negative electroactive material may include a carbonaceous-silicon based composite including, for example, about 10 wt. % of a silicon-based electroactive material and about 90 wt. % graphite. The negative electroactive material may include a carbonaceous-silicon based composite including, for example, 10 wt. % of a silicon-based electroactive material and 90 wt. % graphite.

In certain variations, for example, when the negative electrode includes carbonaceous and/or silicon-based electroactive materials, the negative electroactive material(s) in the negative electrode 22 may be optionally intermingled with one or more electrically conductive materials that provide an electron conductive path and/or at least one polymeric binder material that improves the structural integrity of the negative electrode 22. For example, the negative electroactive material(s) in the negative electrode 22 may be optionally intermingled (e.g., slurry casted) with binders like polyimide, polyamic acid, polyamide, polysulfone, polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, or lithium alginate. Electrically conducting materials may include carbon-based materials, powdered nickel or other metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like. In certain aspects, mixtures of the conductive materials may be used.

The negative electrode 22 may include greater than or equal to about 5 wt. % to less than or equal to about 99 wt. %, optionally greater than or equal to about 10 wt. % to less than or equal to about 99 wt. %, and in certain variations, greater than or equal to about 50 wt. % to less than or equal to about 95 wt. %, of the negative electroactive material(s); greater than or equal to 0 wt. % to less than or equal to about 40 wt. %, and in certain aspects, optionally greater than or equal to about 1 wt. % to less than or equal to about 20 wt. %, of the electronically conducting material; and greater than or equal to 0 wt. % to less than or equal to about 40 wt. %, and in certain aspects, optionally greater than or equal to about 1 wt. % to less than or equal to about 20 wt. %, of the at least one polymeric binder.

The negative electrode 22 may include greater than or equal to 5 wt. % to less than or equal to 99 wt. %, optionally greater than or equal to 10 wt. % to less than or equal to 99 wt. %, and in certain variations, greater than or equal to 50 wt. % to less than or equal to 95 wt. %, of the negative electroactive material(s); greater than or equal to 0 wt. % to less than or equal to 40 wt. %, and in certain aspects, optionally greater than or equal to 1 wt. % to less than or equal to 20 wt. %, of the electronically conducting material; and greater than or equal to 0 wt. % to less than or equal to 40 wt. %, and in certain aspects, optionally greater than or equal to 1 wt. % to less than or equal to 20 wt. %, of the at least one polymeric binder.

In various aspects, the battery 20 further includes one or more protective layers disposed on or adjacent to one or more surfaces of the negative electrode 22. For example, as illustrated, the battery 20 may include a protective layer 100 (e.g., artificial solid-electrolyte interphase ("SEI") layer) disposed between the negative electrode 22 and the separator 26 (or solid-state electrolyte in the instance of solid-state or semi-solid state batteries). The protective layer 100 may be a flexible polymer film having a polymeric matrix and one or more salts dispersed therewith. The polymeric matrix may include, for example, 1,3-dioxolane (DOL) and/or another cyclic ethers (e.g., tetrahydrofuran (THF)). The one or more salts may include for example, lithium nitrate ($LiNO_3$), potassium nitrate ($KNO_3$), cesium nitrate ($CsNO_3$), lithium phosphate ($Li_3PO_4$), potassium phosphate ($K_3PO_4$), cesium phosphate ($Cs_3PO_4$), lithium hexafluorophosphate ($LiPF_6$), lithium difluoro(oxalato)borate (LiDFOB), and combinations thereof.

In various aspects, the protective layer 100 may include greater than or equal to about 10 wt. % to less than or equal to about 90 wt. %, and in certain aspects, optionally greater than or equal to about 30 wt. % to less than or equal to about 70 wt. %, of the polymerized 1,3-dioxolane (DOL) matrix, and greater than or equal to about 10 wt. % to less than or equal to about 90 wt. %, optionally greater than or equal to about 30 wt. % to less than or equal to about 70 wt. %, and in certain aspects, optionally greater than or equal to about 40 wt. % to less than or equal to about 60 wt. %, of the one or more salts.

For example, the protective layer 100 may include, on a sliding scale, greater than or equal to about 5 wt. % to less than or equal to about 30 wt. % of nitrate salt(s) (e.g., lithium nitrate ($LiNO_3$), potassium nitrate ($KNO_3$), cesium nitrate ($CsNO_3$)), greater than or equal to about 20 wt. % to less than or equal to about 80 wt. % of the phosphate salt(s) (e.g., lithium phosphate ($Li_3PO_4$), potassium phosphate ($K_3PO_4$), cesium phosphate ($Cs_3PO_4$)), and greater than or equal to about 20 wt. % to less than or equal to about 30 wt. % of the other salts (e.g., lithium hexafluorophosphate ($LiPF_6$), lithium difluoro(oxalato)borate (LiDFOB), and/or other Lewis acid salts).

The protective layer 100 may include greater than or equal to 10 wt. % to less than or equal to 90 wt. %, and in certain aspects, optionally greater than or equal to 30 wt. % to less than or equal to 70 wt. %, of the polymerized 1,3-dioxolane (DOL) matrix, and greater than or equal to 10 wt. % to less than or equal to 90 wt. %, optionally greater than or equal to 30 wt. % to less than or equal to 70 wt. %, and in certain aspects, optionally greater than or equal to 40 wt. % to less than or equal to 60 wt. %, of the one or more salts.

For example, the protective layer 100 may include, on a sliding scale, greater than or equal to 5 wt. % to less than or equal to 30 wt. % of nitrate salt(s) (e.g., lithium nitrate ($LiNO_3$), potassium nitrate ($KNO_3$), cesium nitrate ($CsNO_3$)), greater than or equal to 20 wt. % to less than or equal to 80 wt. % of the phosphate salt(s) (e.g., lithium phosphate ($Li_3PO_4$), potassium phosphate ($K_3PO_4$), cesium phosphate ($Cs_3PO_4$)), and greater than or equal to 20 wt. % to less than or equal to 30 wt. % of the other salts (e.g., lithium hexafluorophosphate ($LiPF_6$), lithium difluoro(oxalato)borate (LiDFOB), and/or other Lewis acid salts).

In various aspects, the protective layer 100 has a flexibility, for example an elastic modulus, greater than or equal to about 0.01 GPa to less than or equal to about 50 GPa, and in certain aspects, optionally greater than or equal to about 0.1 GPa to less than or equal to about 10 GPa. The protective layer 100 may have an elastic modulus, greater than or equal to 0.01 GPa to less than or equal to 50 GPa, and in certain aspects, optionally greater than or equal to 0.1 GPa to less than or equal to 10 GPa. The protective layer 100 may have an average thickness greater than or equal to about 50 nm to less than or equal to about 10 μm, and in certain aspects, optionally greater than or equal to about 100 nm to less than or equal to about 1 μm. The protective layer 100 may have an average thickness greater than or equal to 50 nm to less than or equal to 10 μm, and in certain aspects, optionally greater than or equal to 100 nm to less than or equal to 1 μm.

Figure 2:
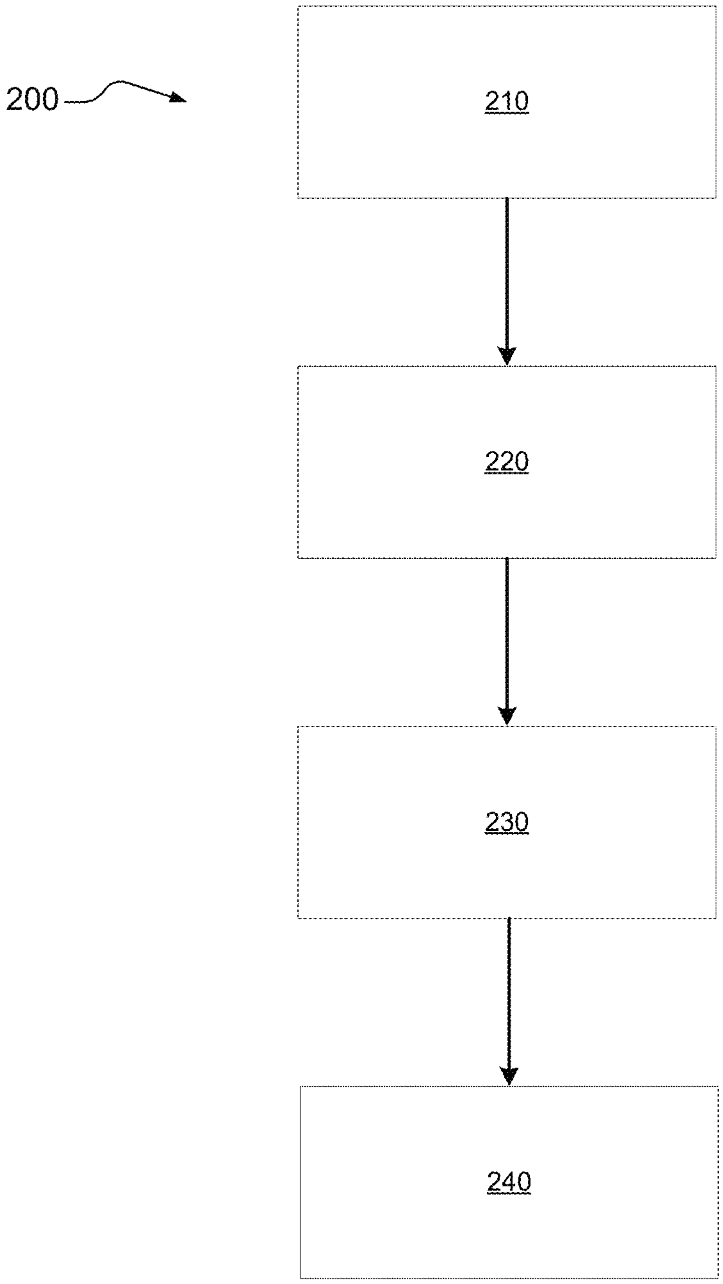
FIG. 2 is a flowchart illustrating an example method for forming an artificial solid-electrolyte interphase ("SEI") layer in accordance with various aspects of the present disclosure.

In various aspects, the present disclosure provides a method for forming a protective coating on a negative electrode, and more particularly, to a method for forming an artificial solid-electrolyte interphase ("SEI") layer on a lithium metal electrode. For example, FIG. 2 illustrates an example method 200 for forming an artificial solid-electrolyte interphase ("SEI") layer, for example, like the protective coating or artificial solid-electrolyte interphase ("SEI") layer 100 illustrated in FIG. 1. The method 200 may include contacting 220 a solution on or adjacent to one or more surfaces of an electrode, for example a lithium metal negative electrode, like the negative electrode 22 illustrated in FIG. 1. For example, contacting 220 may include disposing the solution on the one or more surfaces of the electrode using, for example only, dip coating methods, soaking methods, drop coating methods, and spin coating methods, as known to the skilled artisan. In each instance, the process may occur over a coating or soaking time may be less than or equal to about 5 hours. In certain variations, the method 200 may include preparing 210 the solution.

In each variation, the solution includes a nitrate salt, and in certain instances, one or more other salt dissolved in a solvent. The nitrate salt may include, for example, lithium nitrate ($LiNO_3$), potassium nitrate ($KNO_3$), and/or cesium nitrate ($CsNO_3$). The one or more other salt may include hexafluorophosphate ($LiPF_6$), lithium difluoro(oxalato)borate (LiDFOB), and/or other Lewis acid salts. The one or more other salts may be added to the solution so as to promote subsequent polymerization, thereby modifying the thickness of an as-formed protective layer.

The solution may include greater than or equal to about 5 wt. % to less than or equal to about 50 wt. %, and in certain aspects, optionally greater than or equal to about 10 wt. % to less than or equal to about 20 wt. %, of the salts (including the nitrate salt, and also, the one or more other salts). The solution may include greater than or equal to 5 wt. % to less than or equal to 50 wt. %, and in certain aspects, optionally greater than or equal to 10 wt. % to less than or equal to 20 wt. %, of the salts (including the nitrate salt ($LiNO_3$), and also, the one or more other salts). The solution may have a concentration of the nitrate salt(s) that is greater than 0 M to less than or equal to about 2 M, and in certain aspects, optionally greater than 0 M to less than or equal to 2 M.

The solvent comprises 1,3-dioxolane (DOL) and/or another cyclic ether(s) (e.g., tetrahydrofuran (THF)). In certain variations, the solvent may be a solvent system including a mixture of solvents. For example, the solvent system may include greater than or equal to about 20 wt. % to less than or equal to about 80 wt. %, and in certain aspects, optionally greater than or equal to about 40 wt. % to less than or equal to about 60 wt. %, of a first solvent, and greater than or equal to about 20 wt. % to less than or equal to about 80 wt. %, and in certain aspects, optionally greater than or equal to about 40 wt. % to less than or equal to about 60 wt. %, of a second solvent. The solvent system may include greater than or equal to 20 wt. % to less than or equal to 80 wt. %, and in certain aspects, optionally greater than or equal to 40 wt. % to less than or equal to 60 wt. %, of a first solvent, and greater than or equal to 20 wt. % to less than or equal to 80 wt. %, and in certain aspects, optionally greater than or equal to 40 wt. % to less than or equal to 60 wt. %, of a second solvent.

The first solvent may include 1,3-dioxolane (DOL) and/or another cyclic ether(s) (e.g., tetrahydrofuran (THF)), and the second solvent may be an organic phosphate solvent. The organic phosphate solvent may be represented by:

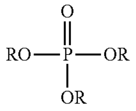

where R is a methyl group, an ethyl group, or $CH_2CF_3$. For example, in certain variations, the organic phosphate solvent is trimethyl phosphate (TMP).

In various aspects, the method 200 further includes polymerizing 230, for example, via ring-open polymerization reactions, the cyclic ether to form a polymerized matrix, which includes the nitrate salt, and in certain instances, the one or more lithium salts, dispersed therewithin. The one or more lithium salts may act as catalyst to promote ring opening of the cyclic ether during polymerization 230. In certain variations, the polymerized matrix may further include a phosphate salt dispersed therewithin. The phosphate salt may result from the reduction of the organic phosphate during polymerization 230. In certain variations, the salts (including the nitrate salt(s), the one or more other salts, and the phosphate salt(s)) maybe uniformly dispersed to form a substantially homogeneous matrix.

In various aspects, the polymerization 230 occurs while the solution is contacted with (e.g., disposed on) the one or more surfaces of the electrode. In certain variations, the method 200 may include vacuum drying 240 the electrode assembly (including the electrode and as formed protective layer) to remove residue not reacted during the polymerization 230, including for example, unreacted excess solvent.

Certain features of the current technology are further illustrated in the following non-limiting examples.

Example 1

Example battery cells may be prepared in accordance with various aspects of the present disclosure.

For example, an example battery cell 310 may include a protective coating (e.g., artificial solid-electrolyte interphase ("SEI") layer) defined by a polymerized matrix including one or more lithium salts and dispersed therewithin, like the battery 20 illustrated in FIG. 1. A comparative battery cell 320 omits the protective coating.

Figure 3A:
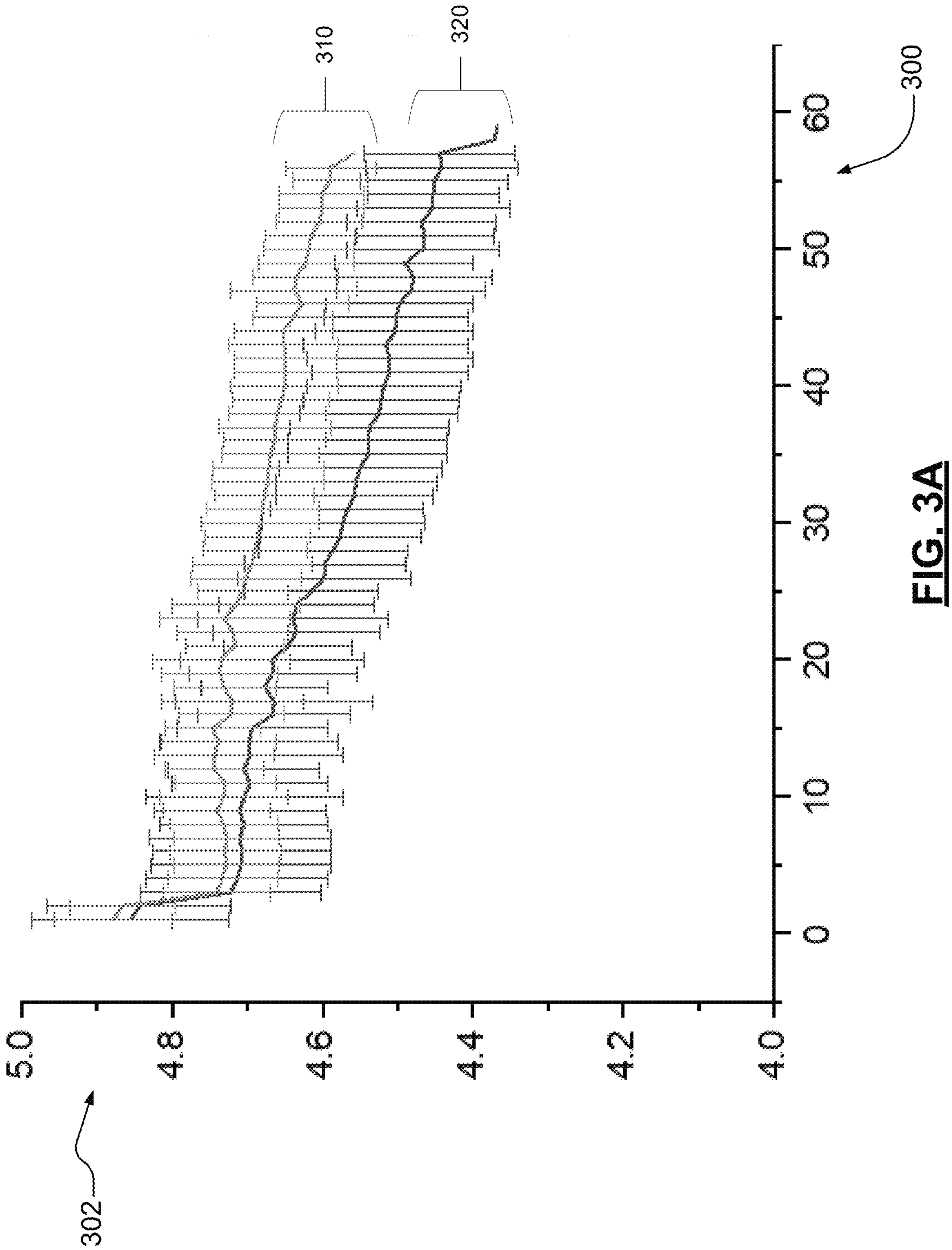
FIG. 3A is a graphical illustration demonstrating the discharge capacity of an example battery cell having an artificial solid-electrolyte interphase ("SEI") layer in accordance with various aspects of the present disclosure.

FIG. 3A is a graphical illustration demonstrating the discharge capacity of the example battery cell 310 as compared to the comparative battery cell 320, where the x-axis 300 represents cycle number, and the y-axis 302 represents discharge capacity ($mAh/cm^2$). As illustrated, the example battery cell 310 has improved cell performance, including both cell discharge capacity and cell cycle stability, which is evidenced by the flattening of the curve with high values, as a function of cycle number.

Figure 3B:
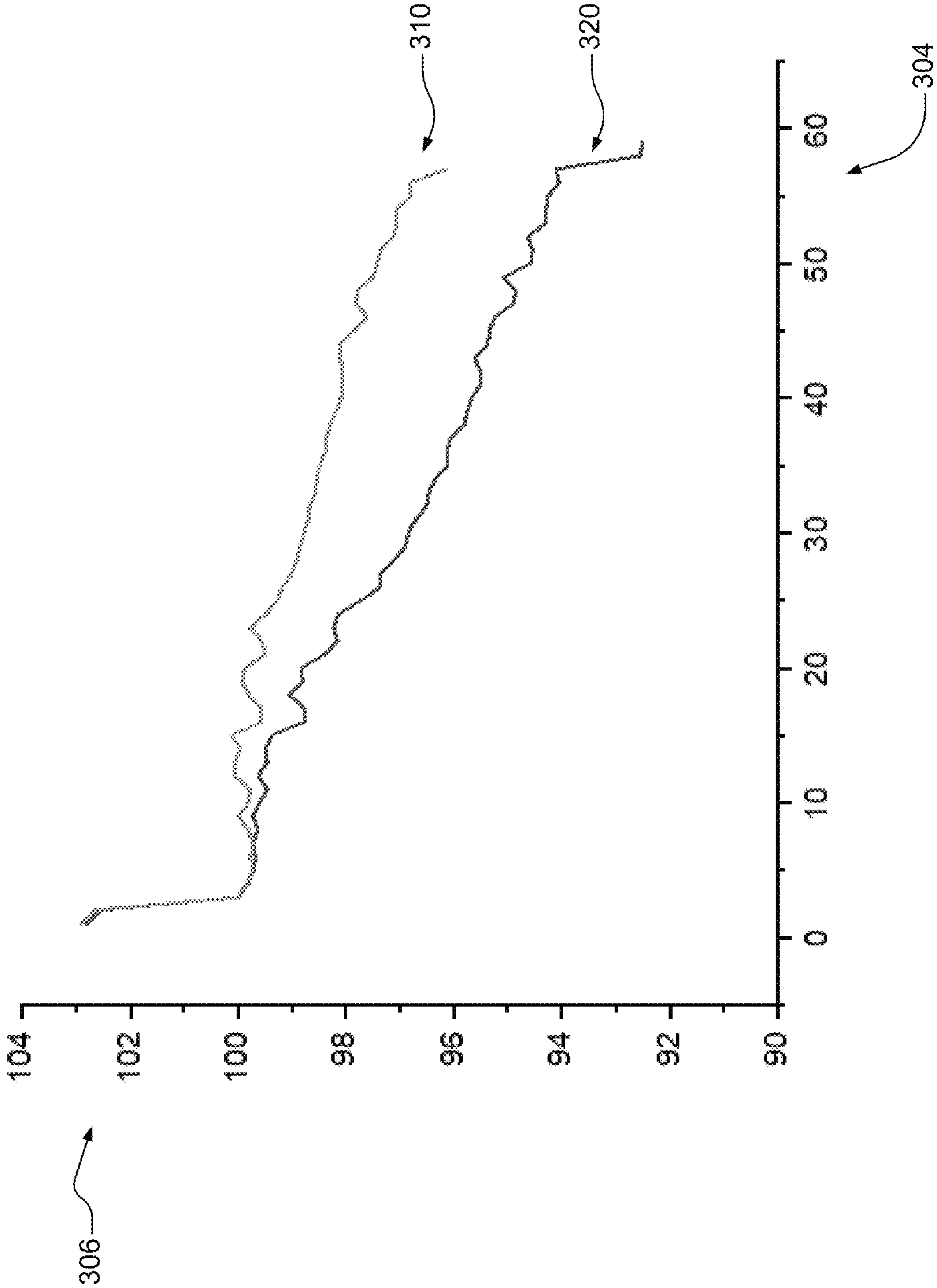
FIG. 3B is a graphical illustration demonstrating the capacity retention of an example battery cell having an artificial solid-electrolyte interphase ("SEI") layer in accordance with various aspects of the present disclosure.

FIG. 3B is a graphical illustration demonstrating the capacity retention of the example battery cell 310 as compared to the comparative battery cell 320, where the x-axis 304 represents cycle number, and the y-axis 306 represents capacity retention (%). As illustrated, the example battery cell 310 has improved capacity retention over time. For example, after 55 cycles the example battery cell 310 drops about 3%, while the comparative battery cell 320 drops about 6%.

Figure 4A:
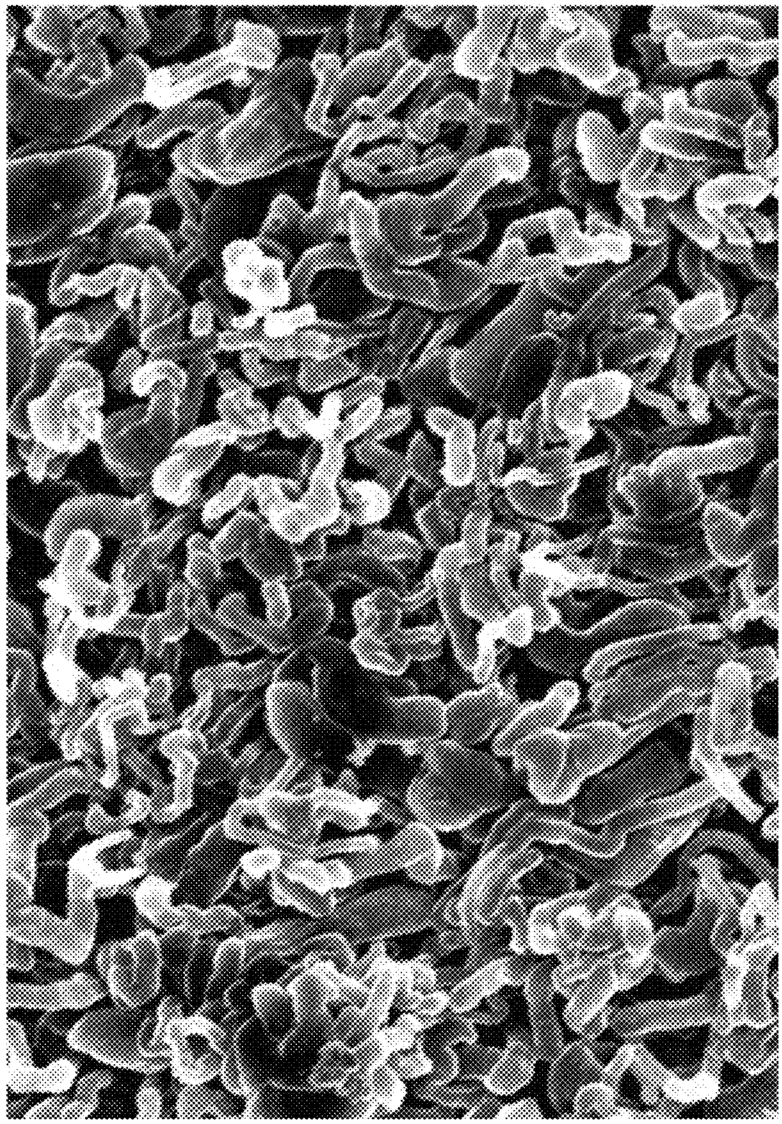
FIG. 4A is a scanning electron microscopy image of a lithium metal electrode in a comparative battery cell.
Figure 4B:
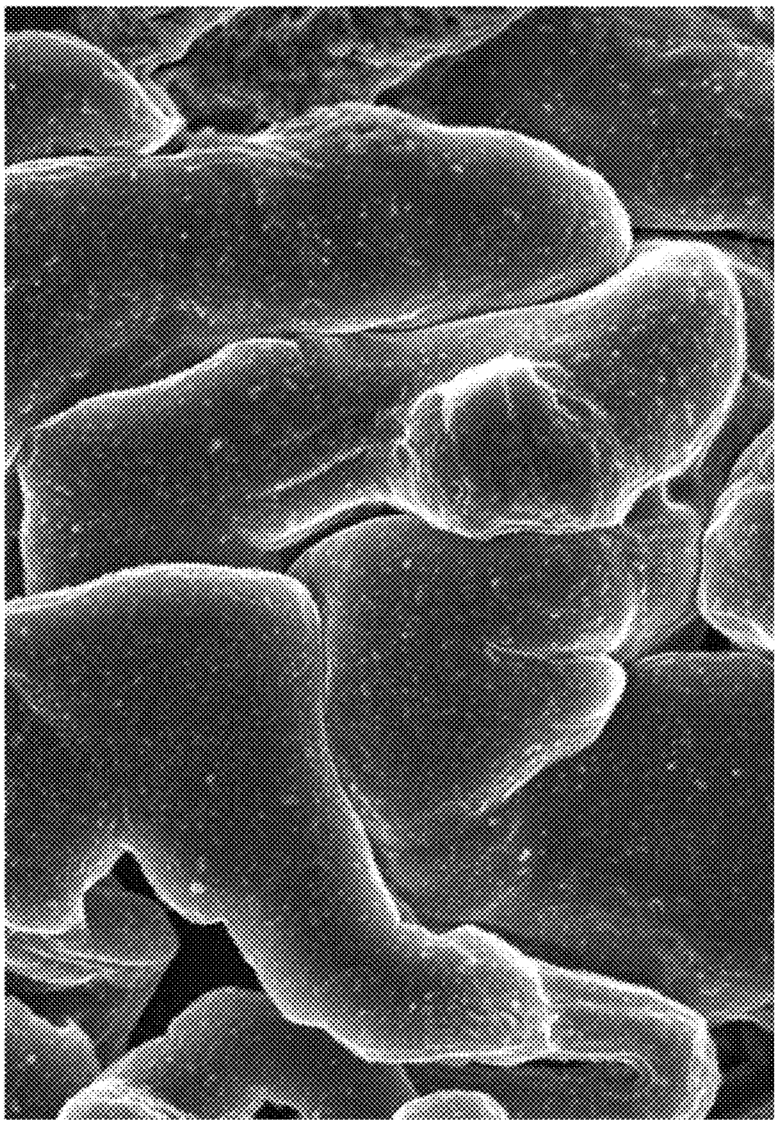
FIG. 4B is a scanning electron microscopy image of a protective coating on a lithium metal electrode in an example battery cell in accordance with various aspects of the present disclosure.

FIG. 4A is a scanning electron microscopy image of a lithium metal electrode in the comparative battery cell 520. FIG. 4B is a scanning electron microscopy image of the protective coating on a lithium metal electrode in the example battery cell 510. As illustrated, after formation of a protective coating, the lithium plating occurs in larger chunks. For example, the needle shapes in FIG. 4A have an average diameter of less than about 1 μm, while the needle shapes in FIG. 4B have an average diameter of less than about 3 μm. The larger lithium plating size lends itself to fewer side reactions, lower surface area and volumetric changes, and dense deposition, each of which necessarily improves cycle life.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrode comprising:

a lithium metal electroactive material layer; and a protective layer disposed on or adjacent to one or more surfaces of the electroactive material layer, the protective layer comprising a polymerized 1,3-dioxolane (DOL) matrix having one or more salts dispersed therewithin, the protective layer comprising greater than or equal to about 20 wt. % to less than or equal to about 80 wt. % of the polymerized 1,3-dioxolane (DOL) matrix and greater than or equal to about 40 wt. % to less than or equal to about 60 wt. % of the one or more salts, the one or more salts comprising a first salt selected from the group consisting of: potassium nitrate ($KNO_3$), cesium nitrate ($CsNO_3$), and combinations thereof and a second salt consisting of cesium phosphate ($Cs_3PO_4$).

2. The electrode of claim 1, wherein the protective layer has an elastic modulus greater than or equal to about 0.01 GPa to less than or equal to about 50 GPa, and a thickness greater than or equal to about 50 nanometers to less than or equal to about 10 micrometers.

3. The electrode of claim 1, wherein at least one of the first salt and the second salt further comprises lithium nitrate ($LiNO_3$).

4. The electrode of claim 1, wherein the one or more salts further comprise a third salt selected from the group consisting of: lithium hexafluorophosphate ($LiPF_6$), lithium difluoro (oxalato) borate (LiDFOB), and combinations thereof.

5. An electrochemical cell that cycles lithium ions, wherein the electrochemical cell comprises:

a lithium metal electrode;

a separator; and a protective layer disposed between the electrode and the separator, the protective layer comprising a polymerized matrix having one or more lithium salts dispersed therewithin, the protective layer comprising greater than or equal to about 20 wt. % to less than or equal to about 80 wt. % of the polymerized matrix and greater than or equal to about 40 wt. % to less than or equal to about 60 wt. % of the one or more lithium salts, the polymerized matrix comprising a polymerized cyclic ether, the one or more salts comprising a first salt selected from the group consisting of: potassium nitrate (KNO3), cesium nitrate (CsNO3), and combinations thereof and a second salt consisting of cesium phosphate ($Cs_3PO_4$).

6. The electrochemical cell of claim 5, wherein the polymerized cyclic ether comprises 1,3-dioxolane (DOL).

7. The electrochemical cell of claim 5, wherein the polymerized cyclic ether comprises tetrahydrofuran (THF).

8. The electrochemical cell of claim 5, wherein the one or more lithium salts further comprise a third salt selected from the group consisting of: lithium hexafluorophosphate ($LiPF_6$), lithium difluoro (oxalato) borate (LiDFOB), and combinations thereof.

9. The electrochemical cell of claim 8, wherein the protective layer comprises:

greater than or equal to about 5 wt. % to less than or equal to about 30 wt. % of the first lithium salt;

greater than or equal to about 20 wt. % to less than or equal to about 80 wt. % of the second lithium salt; and greater than or equal to about 20 wt. % to less than or equal to about 30 wt. % of the third salt.

10. The electrochemical cell of claim 5, wherein the protective layer has an elastic modulus greater than or equal to about 0.01 GPa to less than or equal to about 50 GPa, and a thickness greater than or equal to about 50 nanometers to less than or equal to about 10 micrometers.

11. A method for forming an electrode, the electrode comprising a lithium metal electroactive material layer and a protective layer disposed thereon, the method comprising:

disposing a solution on or adjacent to a surface of the lithium metal electroactive material layer, the solution comprising:

a salt dissolved in a solvent mixture, the salt comprising a first salt selected from the group consisting of: potassium nitrate ($KNO_3$), cesium nitrate ($CsNO_3$), and combinations thereof and a second salt consisting of cesium phosphate ($Cs_3PO_4$), and the solvent mixture comprising a cyclic ether and one or more organic phosphates represented by:

where R is a methyl group, an ethyl group, or $CH_2CF_3$; and polymerizing the cyclic ether to form a matrix comprising the polymerized cyclic ether, the salt being dispersed throughout the matrix to form the protective layer, the protective layer comprising greater than or equal to about 20 wt. % to less than or equal to about 80 wt. % of the matrix and greater than or equal to about 40 wt. % to less than or equal to about 60 wt. % of the salt.

12. The method of claim 11, wherein the cyclic ether comprises 1,3-dioxolane (DOL).

13. The method of claim 11, wherein the cyclic ether comprises tetrahydrofuran (THF).

14. The method of claim 11, wherein at least one of the first and second salts further comprises lithium nitrate ($LiNO_3$).

15. The method of claim 14, wherein the salt further comprises a third salt selected from the group consisting of: lithium hexafluorophosphate ($LiPF_6$), lithium difluoro(oxalato)borate (LiDFOB), and combinations thereof.

16. The method of claim 15, wherein the solution comprises:

greater than or equal to about 20 wt. % to less than or equal to about 80 wt. % of the cyclic ether;

greater than or equal to about 5 wt. % to less than or equal to about 20 wt. % of the first salt;

greater than or equal to about 20 wt. % to less than or equal to about 80 wt. % of the one or more organic phosphates; and greater than or equal to about 5 wt. % to less than or equal to about 20 wt. % of the third salt.

17. The method of claim 11, wherein during the polymerization the one or more organic phosphates are reduced to form a phosphate salt, and the phosphate salt is dispersed throughout the matrix with the first and second salts.

18. The method of claim 11, wherein the method further comprises vacuum drying the protective layer.

19. The electrode of claim 1, wherein the at least one of the first salt and the second salt further comprises:

greater than or equal to about 5 wt. % to less than or equal to about 30 wt. % of lithium nitrate ($LiNO_3$); and greater than or equal to about 20 wt. % to less than or equal to about 80 wt. % of lithium phosphate ($Li_3PO_4$); and the one or more salts further comprises:

greater than or equal to about 20 wt. % to less than or equal to about 30 wt. % of a third salt, the third salt being selected from the group consisting of: lithium hexafluorophosphate ($LiPF_6$), lithium difluoro (oxalato) borate (LiDFOB), and combinations thereof.

20. The electrode of claim 1, wherein the first salt comprises potassium nitrate ($KNO_3$).

* * * * *